United States Patent [19]
Crowe et al.

[11] 4,164,014
[45] Aug. 7, 1979

[54] CONVERTER POWER SUPPLY APPARATUS

[75] Inventors: John E. Crowe; John J. Shanley, both of Bishop's Stortford, England

[73] Assignee: Gould Advance Limited, Essex, England

[21] Appl. No.: 914,897

[22] Filed: Jun. 12, 1978

[51] Int. Cl.² .................. H02M 7/00; H02M 1/18
[52] U.S. Cl. .................................. 363/49; 363/56; 363/97; 363/133
[58] Field of Search ............ 331/113 R, 113 A, 114; 363/22-25, 49, 131, 14 134, 56, 97

[56] References Cited
U.S. PATENT DOCUMENTS

| 2,997,664 | 8/1961 | Jensen | 331/113 A X |
| 3,411,108 | 11/1968 | Phillips | 363/49 X |
| 3,691,450 | 9/1972 | Cox | 363/131 |
| 4,039,921 | 8/1977 | Yoshida et al. | 363/22 |
| 4,047,089 | 9/1977 | Suzuki et al. | 363/49 |

FOREIGN PATENT DOCUMENTS 2453 3/1967 Japan ........................ 363/132

Primary Examiner—William M. Shoop
Attorney, Agent, or Firm—Lawrence E. Laubscher

[57] ABSTRACT

A converter power supply apparatus includes a direct current power supply and an oscillator circuit comprising a feedback transformer and two semiconductor switching devices arranged to be turned on alternately to produce alternating currents in primary winding means of the feedback transformer and in a load circuit. Circuit means couple the load circuit to secondary winding means of the feedback transformer so as to augment control currents fed to the switching devices. Circuit means may be provided to generate a starting pulse and to feed this pulse to the oscillator circuit to cause oscillation to recommence after disconnection of the load circuit. The direct-current source may be provided by rectification of an A.C. input and this input may be controlled in accordance with output voltage of the converter to stabilize the output voltage.

11 Claims, 7 Drawing Figures 4,164,014

CONVERTER POWER SUPPLY APPARATUS

BACKGROUND OF THE INVENTION

This invention relates to power supply apparatus of the converter type, in which output power is obtained by means of an oscillating circuit. The circuit is powered from the input power to be converted and an alternating output is obtained from the oscillatory current of the stage. Such units are convenient for use where it is desired to operate relatively low voltage equipment for an alternating mains supply. The invention has for its object to provide converters which are improved in various respects, as will appear.

A known type of converter power supply apparatus includes oscillator circuit comprising a transformer and two semi-conductor switching devices arranged to be alternately switched to produce a.c. load current through the primary of the transformer, the secondary winding of the transformer providing control current to the switching devices in such a manner as to ensure a constant relation between control and load currents.

SUMMARY OF THE INVENTION

It is an object of the invention to provide converter power supply apparatus having advantages over the known apparatus.

It is a specific object of the invention to provide converter power supply apparatus including an oscillator sensitive to load current and comprising means whereby the oscillator will continue to oscillate in the absence of load current.

It is a further object of the invention to provide converter power supply apparatus including means generating a trigger pulse to cause oscillation to recommence after interruption.

It is another object of the invention to provide converter power supply apparatus providing a voltage-stabilized output.

The invention provides, in a power supply apparatus including a direct-current source, an oscillator circuit comprising a feedback transformer having primary winding means and secondary winding means, and two semiconductor switching devices arranged to be turned on alternately to couple said source to a load circuit by way of said primary winding means of said feedback transformer, thereby to produce alternating current in said load and in said primary winding means, said secondary winding means of said feedback transformer being coupled to provide control currents to said switching devices such as to ensure a constant relation between said load current and said control currents, the improvement whereby said oscillator circuit further comprises circuit means coupled between said load circuit and said secondary winding means of said feedback transformer to augment said control currents thereby to assist the commencement of oscillation in the oscillator circuit.

IN THE DRAWINGS

DESCRIPTION OF THE PREFERRED EMBODIMENTS

The supply unit to be described includes a number of circuits, each for performing a particular function. For clarity, each of the circuits is shown and described separately but may, in practice, be combined with one or more of the other circuits described.

The supply unit includes an oscillatory stage using alternately switched semiconductor switching devices such as transistors, in which oscillation is maintained by means of a feedback transformer which senses the transistor emitter current or collector current in primary winding means of the feedback transformer and provides base current for the transistors from secondary winding means of the feedback transformer in such a manner as to ensure a constant proportionality between base and emitter currents, irrespective of the level of the currents. This type of operation is advantageous in that it provides a convenient method of driving the transistors and in particular is efficient in that only the current necessary for providing base current for the transistors is diverted to that purpose.

Figure 1:
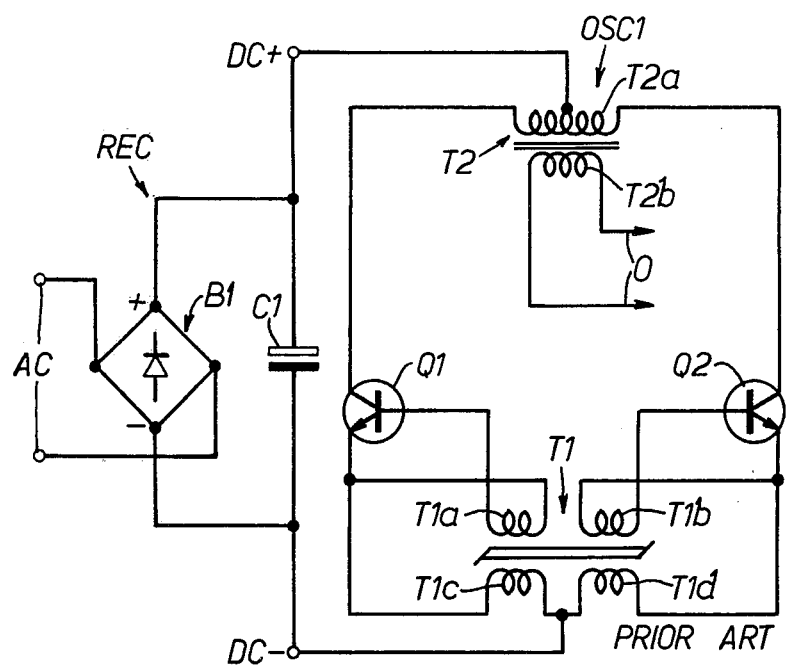
FIG. 1 shows a circuit diagram of a known push-pull converter.

One form of oscillatory stage of this kind is shown in FIG. 1. An alternating voltage is applied to input terminals A.C. of a rectifier unit REC in which the received alternating voltage is rectified by a diode bridge B1, the unidirectional output of which is applied to a reservoir capacitor C1 across which a D.C. supply is available and is fed out by way of terminals D.C.+ and D.C.− to an oscillator unit OSC1. A feedback transformer T1 has windings T1a, T1b which drive the base-emitter circuits of two transistors Q1 and Q2, respectively. The collectors of transistors Q1 and Q2 are connected to the ends of the primary winding T2a of an output transformer T2, the secondary winding T2b of which supplies output current at O. Primary winding T2a of output transformer T2 has a centre-tap which is connected to the positive pole of the D.C. supply provided across capacitor C1 from rectifier bridge B1. The emitter currents of the two transistors Q1 and Q2 pass through two further windings T1c and T1d of feedback transformer T1 to a common point P which is returned to the negative pole of the D.C. supply. The circuit is maintained in oscillation by virtue of the positive feedback provided by transformer T1, which is of the saturating-core type. It will be seen that the circuit operates in push-pull fashion.

Figure 2:
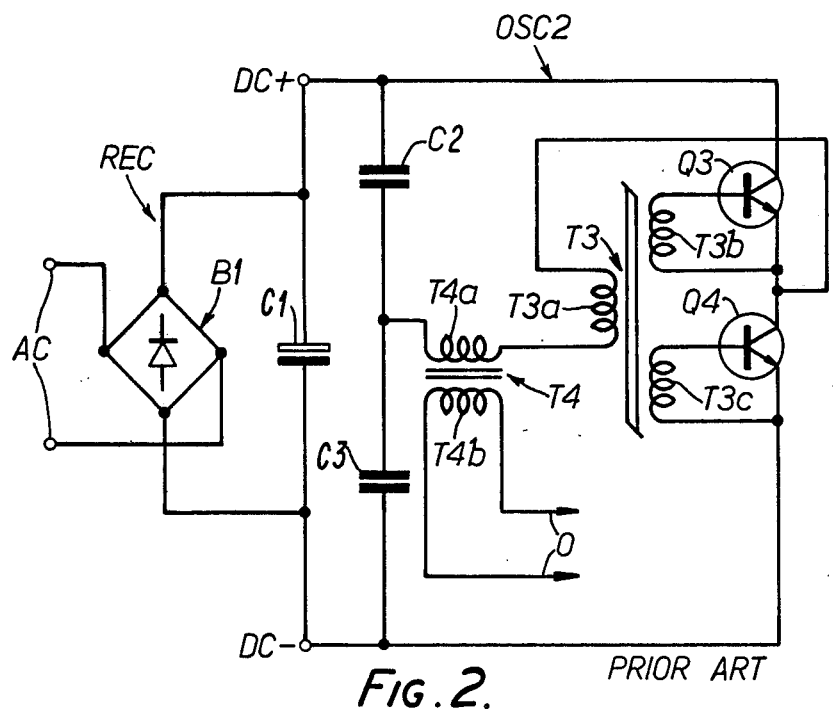
FIG. 2 shows a circuit diagram of a known half-bridge converter.

FIG. 2 shows another form of current feedback oscillatory stage OSC2 fed from a rectifier unit REC identical with that of FIG. 1. As before, an alternating input is applied to terminals A.C., rectified by diode bridge B1 and applied to a reservoir capacitor C1 to provide a D.C. supply. The mechanism by which the feedback operates is as follows. A feedback transformer T3, of the saturating-core type, has a primary winding T3a and secondary windings T3b, T3c which are connected between the emitter and base of transistors Q3 and Q4, respectively. Two equal capacitors C2 and C3 are connected in series across the reservoir capacitor C1 to provide an artificial centre-tap on the D.C. supply. Primary winding T3a of feedback transformer T3 is connected in series with the primary winding of output transformer T4 between the junction of the two capacitors C2, C3 and the junction between transistors Q3, Q4. Transformer T4 has a secondary winding T4b which feeds a load at O.

In this circuit the current load reflected into the primary winding T4a of transformer T4, caused by the conduction of transistor Q3, flows in the primary winding T3a of feedback transformer T4 in such a sense that the winding T3b maintains the transistor Q3 in conduction. The feedback is thus positive. Conduction in transistor Q3 is maintained until the core of transformer T3 saturates, due to the voltage-time integral impressed upon winding T3b of the transformer by the constant base-emitter voltage $V_{be}$ of transistor Q3. When the transformer core saturates, transistor Q3 is then turned off and the consequent reduction in the current flowing in winding T3a of transformer T3 causes a flux reversal in the core, which induces a current in winding T3c, causing transistor Q4 to be turned on. Transistor Q4 is then maintained in conduction in a manner similar to that described above until it in turn is turned off as a result of saturation of the transformer core.

A practical difficulty arises with a circuit of the type shown in FIG. 1 or FIG. 2 because oscillation depends upon a flow of current in the primary winding of the output transformer, representing the reflected load current. For this reason, if the load is removed, then the feedback mechanism fails and the circuit ceases to operate. A circuit arrangement embodying the invention in which this difficulty is overcome is shown in FIG. 3 which shows an oscillator unit assumed to be fed from a rectifier unit REC identical with that of FIGS. 1 and 2.

In accordance with the invention means are provided for augmenting the control currents provided by said feedback transformer in a manner to assist the commencement of oscillation in the circuit.

Figure 3:
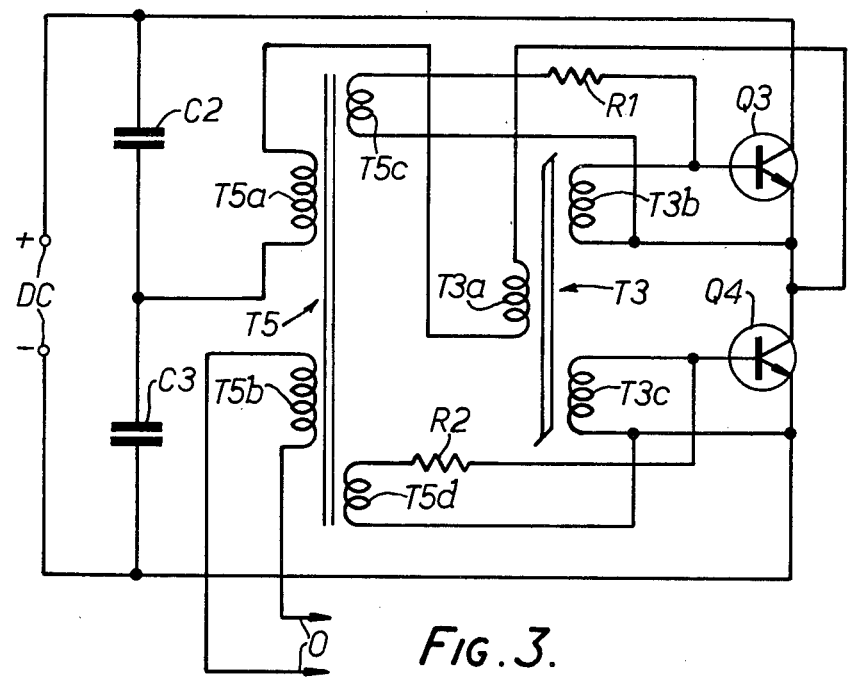
FIG. 3 shows a circuit diagram of a converter similar to that shown in FIG. 2 but incorporating a low load protection circuit according to the present invention.

In FIG. 3 the output transformer T5 has a primary winding T5a and a secondary winding T5b connected to provide an output at O in a manner similar to transformer T4 of FIG. 2. Transformer T5 also has two feedback windings T5c and T5d. Winding T5c of transformer T5 is connected in parallel with winding T3b of transformer T3m through a resistor R1 and winding T5d of transformer T5 is connected in parallel with winding T3c of transformer T3, through a resistor R2. In this way the voltage which appears across the winding T5a of transformer T5 is fed back to augment the base currents of transistors Q3 and Q4; the magnitude of the base current can be controlled by selection of the resistance value of resistors R1 and R2. These are accordingly selected to maintain the switching transistors Q3 and Q4 in conduction in conditions of zero or light load. At moderate or heavy load conditions, the operation becomes substantially that as described above with reference to FIG. 2.

It will be understood without further illustration that the improvement described above in relation to FIG. 3 may also be incorporated in the push-pull oscillator unit OSC1 of FIG. 1. It is only necessary to replace transformer T1 of FIG. 1 by transformer T5 of FIG. 3 and to make appropriate connections by way of resistors R1 and R2 between windings T5c, T5d of transformer T5 and windings T1a, T1b of transformer T1.

RE-STARTING CIRCUIT

Figure 4:
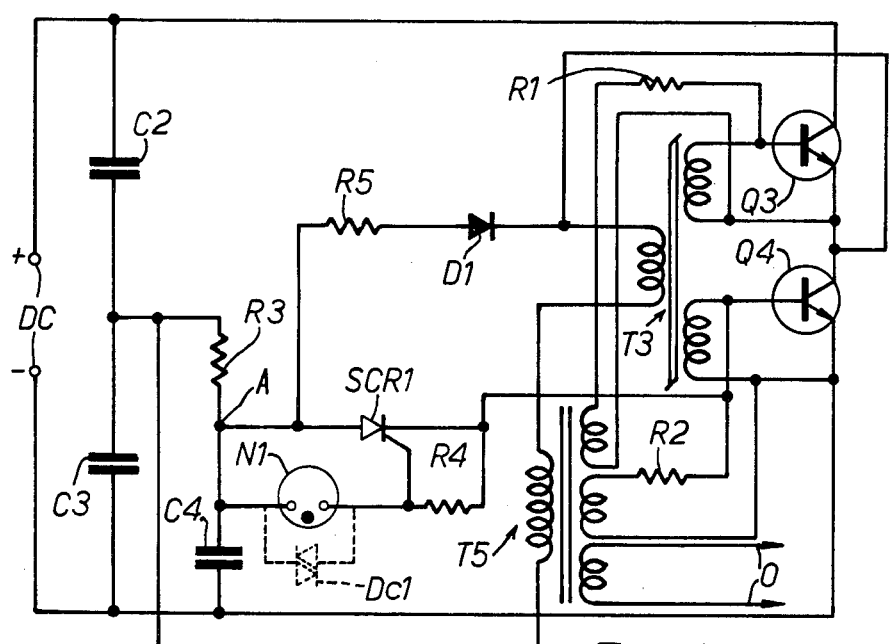
FIG. 4 shows a circuit diagram of a converter similar to that shown in FIG. 2 but incorporating a starter circuit for use with the circuit shown in FIG. 3.

A further practical difficulty which arises with the circuit of the type shown in FIG. 1, 2 or 3 is that the oscillatory condition is not self-starting and some means must be introduced of initiating oscillation. One means of initiating oscillation is indicated in the circuit of FIG. 4.

Oscillation can be started by injecting an appropriate pulse into the base of one of the two transistors Q3 or Q4, but this is not easily accomplished since the base-emitter junction of transistor Q4, for example, is shunted by the relatively low inductance presented by winding T3c of transformer T3. Consequently, the current pulse must have a very steep wavefront if the resultant base current is not reduced to a low value before transistor Q3 has had time in which to become conductive. In FIG. 4, components corresponding to those of FIG. 3 bear like reference numerals and to this extent the circuit will not be further described. However, the circuit also includes a resistor R3 connected in series with a capacitor C4 across the capacitor C3. Alternatively R3 can be connected across the series combination of capacitors C2, C3. The junction A between R3 and C4 is connected through a silicon controlled rectifier, or thyristor SCR1, to the base of transistor Q4. A neon tube N1 is also connected between the anode and gate terminals of the thyristor and a resistor R4 is connected between the cathode and gate terminals of the thyristor. The junction A of R3 and C4 is connected also through a resistor R5 and a diode D1 to the common connection between the emitter of transistor Q3 and the collector of transistor Q4. Neon tube N1 may be replaced by a diac Dc1 if preferred.

When power is applied to the circuit, capacitors C2 and C3 become charged. The junction of R3 and C4, that is, point A, rises in potential at a rate determined by the time constant R3, C4. When the potential at point A reaches the striking potential of the neon tube N1 (or diac Dc1), the neon (or diac) fires and the thyristor SCR1 is consequently triggered. The charge in capacitor C4 is then discharged through the thyristor into the base of transistor Q4. By appropriate component selection, this pulse can be made sufficient to cause the initiation of oscillation. When oscillation is established, point A will be held at a low potential by virtue of the rectifying effect of diode D1; this causes the thyristor SCR1 and the neon N1 to be held in the non-conductive condition. If at any time the circuit should cease to oscillate, diode D1 ceases to maintain the low potential at point A and the thyristor again fires, restarting oscillation. The thyristor is necessary since it is unlikely that the current through a neon tube would have a fast enough rise-time to initiate oscillation due to its relatively high resistance.

Figure 5:
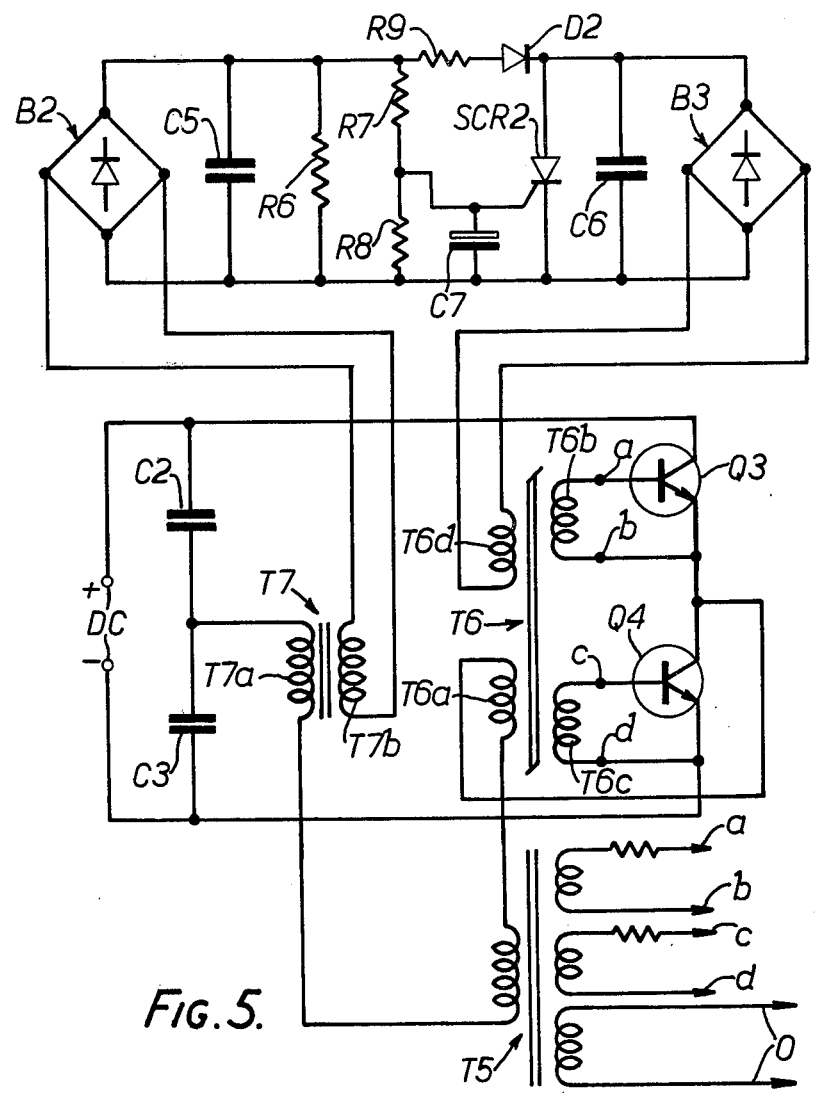
FIG. 5 shows a circuit diagram of a converter similar to that shown in FIG. 2 but incorporating an overcurrent protection circuit for use with the circuit shown in FIG. 3 or 4.

Another difficulty that arises with converters of the type so far described is that in the absence of means for controlling the output voltage it is difficult to provide means for limiting the output current, for protection purposes, under conditions of excessive load or short circuit on the output of the supply unit. FIG. 5 shows a method by means of which overload protection can be obtained.

In FIG. 5 means are provided for sensing the load current and in the event of excessive load the oscillation transformer is damped to an extent which causes oscillation to cease.

As shown in FIG. 5, in which components similar to those of the previous Figures bear similar reference numerals, of which windings T6a, T6b and T6c are connected similarly to corresponding windings of transformer T3 of preceding embodiments is replaced by a transformer T6 which is similar to but which is provided with a further winding T6d. Also, a further transformer T7 is used which has a winding T7a through which the output current flows and a secondary winding T7b which feeds a bridge rectifier B2. The current flowing in winding T7a of transformer T7 will thus be proportional to the load current and a corresponding load-representative voltage will be developed across the winding T7b of this transformer. This voltage is rectified and applied to a capacitor C5, shunted by a resistor R6. A fraction of the voltage which is developed across R6 is selected by means of a potential divider comprising two resistors R7 and R8 connected in series across R6 and applied to the control electrode of a thyristor SCR2. The anode of thyristor SCR2 is connected to the positive pole of bridge B2 through a diode D2 and a resistor R9 and the thyristor is shunted by a capacitor C6. A further capacitor C7 is connected in parallel with resistor R8.

When the voltage at the junction of resistors R7 and R8 reaches a value sufficient to cause the thyristor SCR2 to conduct, the thyristor is triggered into its conductive state and places a heavy load upon one diagonal of a diode bridge B3 of which the other diagonal is connected across the winding T6d of transformer T6. The thyristor, when conductive, thus places a heavy load on the winding T6d of transformer T6, which is sufficient to cause the oscillatory condition to cease, thus suppressing the output from the supply unit.

As the circuit of FIG. 5 is operated in conjunction with the starter circuit of FIG. 4, the components of the FIG. 4 circuit will then make periodic attempts to restart oscillation, at intervals determined by the time constant R3, C4. This will continue indefinitely, or until such time as the overload is removed after which the oscillatory condition will be reinstituted in the normal way.

Figure 6:
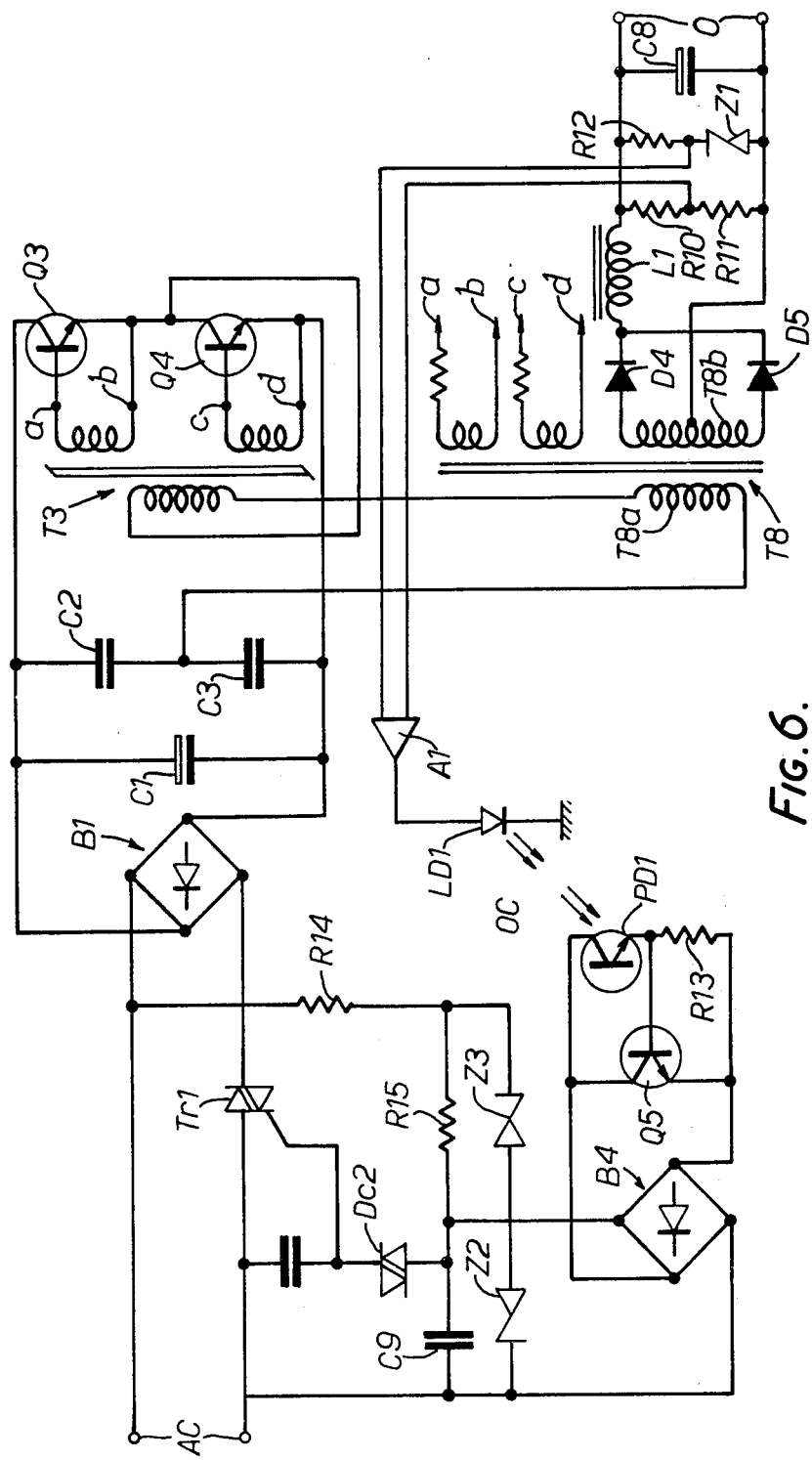
FIG. 6 shows a circuit diagram of a converter similar to that shown in FIG. 2 but incorporating a regulating circuit for use with the circuit shown in FIG. 3, 4 or 5.

It is frequently desirable that a supply unit of the type described should be provided with means for controlling the output voltage of the converter so as to hold this voltage constant against fluctuations in the input supply voltage or to prevent voltage variations due to variations of the current load supplied by the converter. FIG. 6 shows one means by which this desirable object can be achieved. This circuit operates by controlling the voltage which appears across the input reservoir capacitor of the circuit, in response to a signal derived from the output voltage.

In FIG. 6, components corresponding to those of the other Figures bear like reference numerals. The main reservoir capacitor C1 is shunted by capacitor pair C2 and C3 and oscillation is maintained by transformer T3, driving transistors Q3 and Q4. The voltage developed across the capacitor C1, from bridge rectifier B1, is controlled by controlling the input alternating voltage to the bridge by means of a Tr1 in response to the output voltage of the converter.

An output transformer T8 of the converter has a centre-tapped secondary winding T8b from which diodes D4 and D5 are fed to produce a rectified output which is fed to output O through a filter comprising an inductor L1 and a capacitor C8. The voltage which appears across capacitor C8 is examined by a bridge circuit comprising resistors R10, R11, R12 and Zener diode Z1 the differential voltage is applied to the input of an amplifier A1 which feeds a light emitting diode LD1. The light emission of this diode, which forms one part of an opto-coupler OC, will thus vary in accordance with the output voltage across capacitor C8.

The second part of the opto-coupler OC comprises a light sensitive transistor PD1 connected between the collector and base of a transistor Q5, a resistor R13 being connected between base and emitter of this transistor, so that the resistance offered by the collector emitter path of the transistor will be a function of the output voltage of the photo transistor PD1.

To control the triac Tr1, a resistor R14 is connected in series with a resistor R15 and a capacitor C9 across the input alternating supply. The series combination of capacitor C9 and resistor R15 is shunted by two oppositely connected Zener diodes Z2 and Z3 so that the voltage is established across the series connection of capacitor C9 and R15 in each half cycle of the applied alternating voltage is limited. The voltage at the junction of C9 and R15 is applied through a diac DC2 to the control electrode of the triac Tr1. Capacitor C9 is also shunted by one diagonal of a diode bridge B4 of which the other diagonal is connected to the collector and emitter of transistor Q5.

With this circuit, when an alternating current input is applied to the terminals A.C., a limited alternating voltage is developed across the series combination of Zener diodes Z2 and Z3. This causes capacitor C9 to charge, through resistor R15, in the appropriate direction during each half cycle of the alternating current input. The triac Tr1 will therefore be caused to fire at an appropriate point in the cycle when the voltage across capacitor C9 reaches the trigger voltage of the triac, through diac Dc2. Accordingly, the instant in the cycle at which the Tr1 is caused to fire can be controlled by variation of an impedance presented across capacitor C9, and such an impedance is presented by the bridge B4, which will be controlled by transistor Q5 and in turn controlled by the opto-coupler OC, in response to the output voltage of the converter.

Figure 7:
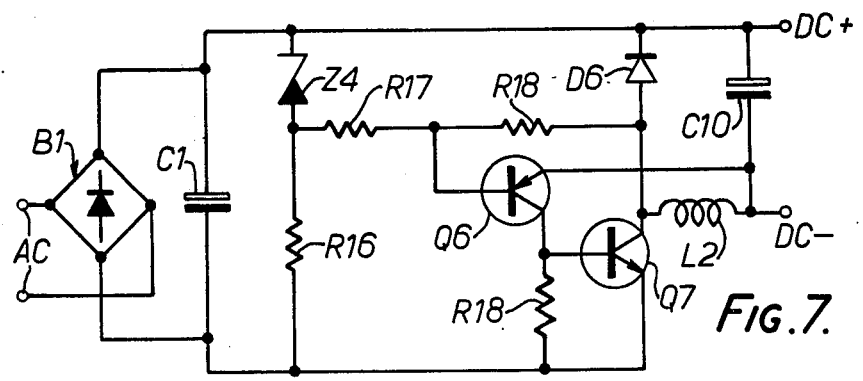
FIG. 7 shows a circuit diagram of a further regulator circuit for use with the circuit shown in FIG. 3, 4, 5 or 6.

FIG. 7 shows an arrangement which serves for controlling the input voltage developed across the input reservoir capacitor C1 of the system. In FIG. 7 a power transistor is used in a high frequency DC to DC chopper. Such circuits can take various forms but that of FIG. 7 is an "on-demand" chopper regulator. In FIG. 7 the input alternating current is applied to bridge B1 and the rectified bridge voltage is applied to the reservoir capacitor C1. Connected across capacitor C1 is a Zener diode Z4 in series with a resistor R16. The voltage appearing at the junction of Zener diode Z4 with resistor R16 is applied through a resistor R17 to the base of a transistor Q6, the collector current of which passes through a resistor R18. The voltage developed across this last resistance controls the base emitter voltage of a transistor Q7, the emitter collector path of transistor Q7 being connected between the output of bridge B1 and the negative output terminal DC— in series with a filter inductor L2 to an output capacitor C10. The voltage across capacitor C10 is the voltage which is then applied to the input of the converter proper. The output voltage at terminal DC— is also applied to the emitter of transistor Q6 which thus acts as a voltage comparator. When the output voltage is low compared with the reference voltage developed across the Zener diode Z4 the main control transistor Q7 is driven to a conductive condition by operation of transistor Q6 in a manner to restore the output voltage across capacitor C10. Similarly, if the output voltage is high, transistor Q7 is turned off. The circuit will thus act cyclically with Q7 being turned on and off in accordance with the demand made by the load. A small proportion of the collector switching waveform of transistor Q7 is fed back to the reference voltage source by a potential divider presented by resistor R17 and a further resistor R18. By this means positive feedback is provided to ensure that the circuit operates in an oscillatory manner. A diode D6 is used as a flywheel diode to prevent voltage peaks arising when current through L2 is interrupted by Q7. The DC to DC chopper described can be used to regulate either the input or the output of a converter.

It will be seen that the invention thus provides improvements applicable to current feedback inverters having a low load protection circuit and involving improved starting means and/or means for controlling the output both with respect to load conditions and to voltage variations.

What is claimed is:

1. In a power supply apparatus including a direct-current source, oscillator circuit means including a feedback transformer having primary and secondary winding means, and a pair of semiconductor switching devices alternately operable to couple said source to a load circuit via said primary winding means, thereby to produce alternating current in said load circuit and in said primary winding means, said secondary winding means being coupled to supply to said switching devices control currents for ensuring a constant relation between said load current and said control currents, and circuit means coupled between said load circuit and said secondary winding means for augmenting said control currents, thereby to assist in commencing oscillation of said oscillator circuit means;
the improvement wherein said oscillator circuit means further includes pulse generator means for generating a starter pulse for initiating oscillation of said oscillator circuit means.

2. The invention claimed in claim 1, wherein said starter circuit comprises charge accumulating means (C4) and means (SCR1) for initiating release of the charge to provide a current pulse to a control terminal of one of said switching devices (Q4).

3. The invention claimed in claim 2, wherein said triggering means comprises a controlled switching device (SCR1) and a gating device (N1, Dc1) for controlling operation of the controlled switching device at a predetermined voltage.

4. The invention claimed in claim 3, wherein the controlled switching device is a semi-conductor controlled rectifier (SCR1).

5. The invention claimed in claim 4, wherein said gating device is a neon (N1) or diac (Dc1) in the gate circuit of the semi-conductor controlled rectifier.

6. The invention claimed in claim 2, and further comprising means for detecting cessation of oscillation of said oscillator circuit and in response to said detection to initiate said release of the charge in said charge accumulating means.

7. The invention claimed in claim 6, wherein said means for detecting cessation of oscillation comprises a diode (D1) connected between the primary winding of the feedback transformer and an electrode of the triggering means.

8. The invention claimed in claim 1 and comprising further means responsive to said output current exceeding a predetermined level to load said feedback transformer thereby to inhibit oscillation of said oscillator.

9. The invention claimed in claim 8, wherein said further means comprises a sensing transformer (T7) having a primary winding coupled in series with the primary winding of said output transformer, said sensing transformer having a secondary winding coupled to a rectifier yielding a unidirectional voltage representative of said load current, a loading winding on said output transformer, an electronic switch operable in response to a control voltage exceeding a predetermined threshold level to short-circuit said loading winding and circuit means applying said unidirectional voltage to said electronic switch as said control voltage, whereby said loading winding inhibits oscillation of said oscillator when said load current exceeds a predetermined level.

10. The invention claimed in claim 1, wherein said direct current source comprises a rectifier fed from an A.C. supply and further comprising regulating means for controlling the supply to said oscillator from said source, said regulating means comprising cyclically controlled switch means connected between said A.C. source and said rectifier.

11. The invention claimed in claim 10, wherein said regulating means comprises a sensing amplifier having two inputs and an output, a first input of said sensing amplifier coupled to receive a predetermined fraction of a direct voltage derived from said further rectifier means, a second input of said sensing amplifier being coupled to receive a reference voltage and the output of said sensing amplifier being coupled to control the duty cycle of said switch means.

* * * * *